(12) United States Patent
Bedford et al.

(10) Patent No.: US 6,811,596 B1
(45) Date of Patent: Nov. 2, 2004

(54) PHASE CHANGE INKS WITH IMPROVED IMAGE PERMANENCE

(75) Inventors: Christine E. Bedford, Burlington (CA); Marcel P. Breton, Mississauga (CA); H. Bruce Goodbrand, Hamilton (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/436,177

(22) Filed: May 12, 2003

(51) Int. Cl.$^7$ ............................................. C09D 11/00
(52) U.S. Cl. ................. 106/31.29; 106/31.61; 106/31.58; 106/31.86
(58) Field of Search .............. 106/31.29, 31.61, 106/31.58, 31.86, 31.6

(56) References Cited

U.S. PATENT DOCUMENTS

| | | | |
|---|---|---|---|
| 3,653,932 A | 4/1972 | Berry et al. ................ | 106/22 |
| 4,256,493 A | 3/1981 | Yokoyama et al. .......... | 106/22 |
| 4,390,369 A | 6/1983 | Merritt et al. ............. | 106/31 |
| 4,484,948 A | 11/1984 | Merritt et al. ............ | 106/31 |
| 4,684,956 A | 8/1987 | Ball ........................ | 346/1.1 |
| 4,851,045 A | 7/1989 | Taniguchi .................. | 106/31 |
| 4,889,560 A | 12/1989 | Jaeger et al. .............. | 106/27 |
| 4,889,761 A | 12/1989 | Titterington et al. ....... | 428/195 |
| 5,006,170 A | 4/1991 | Schwarz et al. ............. | 106/20 |
| 5,151,120 A | 9/1992 | You et al. .................. | 106/27 |
| 5,221,335 A | 6/1993 | Williams et al. ............ | 106/23 |
| 5,372,852 A | 12/1994 | Titterington et al. ....... | 427/288 |
| 5,496,879 A | 3/1996 | Griebel et al. ............. | 524/320 |
| 5,621,022 A | 4/1997 | Jaeger et al. .............. | 523/161 |
| 5,643,356 A | 7/1997 | Nohr et al. ................ | 106/31.49 |
| 5,750,604 A | 5/1998 | Banning et al. ............. | 524/187 |
| 5,779,779 A | * 7/1998 | Jolly ....................... | 106/31.29 |
| 5,780,528 A | 7/1998 | Titterington et al. ....... | 523/161 |
| 5,782,966 A | 7/1998 | Bui et al. .................. | 106/31.43 |
| 5,783,658 A | 7/1998 | Banning et al. ............. | 528/590 |
| 5,827,918 A | 10/1998 | Titterington et al. ....... | 524/590 |
| 5,830,942 A | 11/1998 | King et al. ................. | 524/590 |
| 5,855,655 A | 1/1999 | Nohr et al. ................ | 106/31.27 |
| 5,919,839 A | 7/1999 | Titterington et al. ....... | 523/161 |
| 6,174,937 B1 | 1/2001 | Banning et al. ............. | 523/160 |
| 6,255,432 B1 | 7/2001 | Evans et al. ............... | 528/49 |
| 6,309,453 B1 | 10/2001 | Banning et al. ............ | 106/31.29 |
| 6,476,219 B1 | 11/2002 | Duff et al. ................. | 540/128 |

FOREIGN PATENT DOCUMENTS

| | | |
|---|---|---|
| EP | 0 187 352 | 7/1986 |
| EP | 0 206 286 | 12/1986 |
| WO | WO 94/04619 | 3/1994 |
| WO | WO 97/20000 | 6/1997 |

OTHER PUBLICATIONS

Copending Application 10/369,981, filed Feb. 20, 2003, entitled "Phase Change Inks With Isocyanate–Derived Antioxidants and UV Stabilizers," by Jeffery H. Banning, et al.
English abstract for German Patent Publication DE 4205636AL.
English abstract for German Patent Publication DE 4205713AL.
English abstract for Japanese Patent Publication JP 09255696–A2.

* cited by examiner

*Primary Examiner*—Mark L. Bell
*Assistant Examiner*—Veronica F. Faison

(57) ABSTRACT

Phase change inks comprising colorant, a phase change ink carrier, and an antioxidant or UV stabilizer of the formula

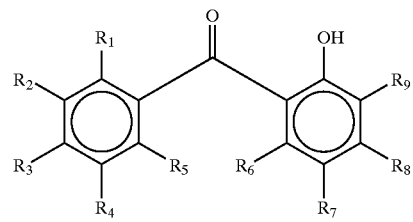

wherein $R_1$, $R_2$, $R_3$, $R_4$, $R_5$, $R_6$, $R_7$, $R_8$, and $R_9$ each, independently of the others, is hydrogen, hydroxy, amino, alkyl, aryl, arylaikyl, alkylaryl, alkoxy, aryloxy, arylalkyloxy, alkylaryloxy, halogen, cyano, aldehyde, ketone, ester, amide, sulfide, sulfoxide, nitrile, sulfone, acyl, or carboxylic acid, provided that at least one of $R_1$, $R_2$, $R_3$, $R_4$, $R_5$, $R_6$, $R_7$, $R_8$, and $R_9$ is alkyl having at least about 8 carbon atoms, alkoxy having at least about 8 carbon atoms, aryl having at least about 6 carbon atoms, aryloxy having at least about 6 carbon atoms, arylalkyl having at least about 7 carbon atoms, arylalkyloxy having at least about 7 carbon atoms, alkylaryl having at least about 7 carbon atoms, or alkylaryloxy having at least about 7 carbon atoms.

22 Claims, No Drawings

PHASE CHANGE INKS WITH IMPROVED IMAGE PERMANENCE

CROSSREFERENCES TO COPENDING APPLICATIONS

Copending Application Ser. No. 10/369,981, filed Feb. 20, 2003, entitled "Phase Change Inks With Isocyanate-Derived Antioxidants and UV Stabilizers," with the named inventors Jeffery H. Banning, Donald R. Titterington, and Mary Ryan-Hotchkiss, the disclosure of which is totally incorporated herein by reference, discloses a phase change ink composition comprising (a) a colorant and (b) the reaction product of (i) an isocyanate and (ii) an antioxidant or UV stabilizer molecule having thereon (A) at least one isocyanate-reactive hydroxyl group and/or (B) at least one isocyanate-reactive primary or secondary amino group. In Example IX, this Example discloses as a comparative material a phase change ink containing 2-hydroxy-4-n-octoxybenzophenone.

BACKGROUND OF THE INVENTION

The present invention is directed to hot melt or phase change inks. More specifically, the present invention is directed to phase change inks particularly suitable for use in phase change ink jet printers. One embodiment of the present invention is directed to a phase change ink composition comprising (a) a colorant, (b) a phase change ink carrier, and (c) an antioxidant or UV stabilizer molecule of the formula

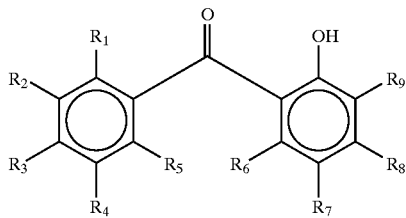

wherein $R_1$, $R_2$, $R_3$, R4, $R_5$, $R_6$, $R_7$, $R_8$, and $R_9$ each, independently of the others, is (i) a hydrogen atom, (ii) a hydroxy group, (iii) an amino group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a halogen atom, (xiii) a cyano group, (xiv) an aldehyde group, (xv) a ketone group, (xvi) an ester group, (xvii) an amide group, (xviii) a sulfide group, (xix) a sulfoxide group, (xx) a nitrile group, (xxi) a sulfone group, (xxii) an acyl group, or (xxiii) a carboxylic acid group, provided that at least one of $R_1$, $R_2$, $R_3$, $R_4$, $R_5$, $R_6$, $R_7$, $R_8$, and $R_9$ is an alkyl group having at least about 8 carbon atoms, an alkoxy group having at least about 8 carbon atoms, an aryl group having at least about 6 carbon atoms, an aryloxy group having at least about 6 carbon atoms, an arylalkyl group having at least about 7 carbon atoms, an arylalkyloxy group having at least about 7 carbon atoms, an alkylaryl group having at least about 7 carbon atoms, or an alkylaryloxy group having at least about 7 carbon atoms.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Japanese Patent Publication JP 09255696-A2, the disclosure of which is totally incorporated herein by reference, discloses a benzophenone derivative having an oxyalkylene group thereon which exhibits UV light-absorbing effects and water solubility, said derivative being of the formula

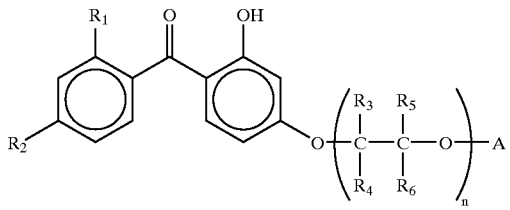

wherein $R_1$ and $R_2$ are each hydrogen atoms, hydroxyl groups, or alkoxy groups with 1 to 4 carbon atoms, $R_3$, $R_4$, $R_5$, and $R_6$ are each hydrogen or an alkyl group with 1 to 2 carbon atoms, wherein one or more of $R_3$ to $R_6$ is alkyl, A is a saccharide group not having a protecting group, and n is 1 or 2. The derivative is prepared by, for example, reacting 2,4-dihydroxybenzophenone with propylene oxide in the presence of sodium bicarbonate in ion-exchanged water at reflux temperature. Also disclosed are preparations containing the derivative and used for external application to skin.

U.S. Pat. No. 4,256,493 (Yokoyama et al.), the disclosure of which is totally incorporated herein by reference, discloses a jet ink composition which comprises an aqueous jet ink containing a water-soluble dye, a wetting agent and water as main components and, incorporated therein, a water-soluble ultraviolet absorbing agent as well as a metal salt, when necessary.

U.S. Pat. No. 5,643,356 (Nohr et al.), the disclosure of which is totally incorporated herein by reference, discloses an improved ink suitable for ink jet printing comprising a mixture of a colorant, an arylketoolkene stabilizing compound or a photoreactor, and a liquid vehicle, wherein the colorant is light-stable. When the photoreactor is combined with a wavelength-selective sensitizer to form a radiation transorber, the colorant is mutable upon exposure of the radiation transorber to specific, narrow bandwidth radiation. The colored composition may also contain a molecular includant having a chemical structure which defines at least one cavity wherein each of the colorant and photoreactor or radiation transorber is associated with the molecular includant. The invention also includes ink jet print cartridges containing the improved ink, ink jet printers containing the improved ink and methods of printing using the improved ink.

U.S. Pat. No. 5,855,655 (Nohr et al.), the disclosure of which is totally incorporated herein by reference, discloses an ink set of inks which have substantially identical light fastness properties. The ink set includes ink compositions containing a colorant and at least one colorant stabilizer. The colorant stabilizer imparts light-stability to the colorant so that the colorant does not fade when exposed to electromagnetic radiation such as sunlight or artificial light. The ink set provides a range of colored inks having similar light-stability.

PCT Patent Publication WO 97/20000 (Nohr et al.), the disclosure of which is totally incorporated herein by reference, discloses colorant stabilizers and a colorant composition which includes a colorant and a colorant stabilizer. The colorant stabilizer imports light-stability to the colorant so that the colorant does not fade when exposed to electromagnetic radiation such as sunlight or artificial light.

While known compositions and processes are suitable for their intended purposes, a need remains for improved phase change ink compositions. In addition, a need remains for phase change ink compositions with improved lightfastness. Further, a need remains for phase change ink compositions suitable for use in the production of digital photographs. Additionally, a need remains for phase change ink compositions suitable for generating prints with good archival qualities. There is also a need for phase change ink compositions with the above advantages which can be, if desired, of relatively simple composition. In addition, there is a need for phase change inks containing antioxidants and/or UV stabilizers that are soluble within the ink carrier. Further, there is a need for phase change inks with the above advantages that exhibit desirable jetting characteristics.

SUMMARY OF THE INVENTION

The present invention is directed to a phase change ink composition comprising (a) a colorant, (b) a phase change ink carrier, and (c) an antioxidant or UV stabilizer molecule of the formula

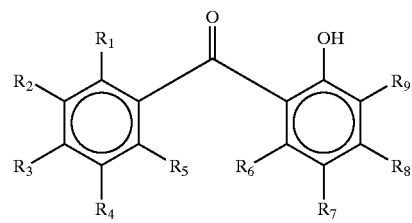

wherein $R_1$, $R_2$, $R_3$, $R_4$, $R_5$, $R_6$, $R_7$, $R_8$, and $R_9$ each, independently of the others, is (i) a hydrogen atom, (ii) a hydroxy group, (iii) an amino group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a halogen atom, (xiii) a cyano group, (xiv) an aldehyde group, (xv) a ketone group, (xvi) an ester group, (xvii) an amide group, (xviii) a sulfide group, (xix) a sulfoxide group, (xx) a nitrile group, (xxi) a sulfone group, (xxii) an acyl group, or (xxiii) a carboxylic acid group, provided that at least one of $R_1$, $R_2$, $R_3$, $R_4$, $R_5$, $R_6$, $R_7$, $R_8$, and $R_9$ is an alkyl group having at least about 8 carbon atoms, an alkoxy group having at least about 8 carbon atoms, an aryl group having at least about 6 carbon atoms, an aryloxy group having at least about 6 carbon atoms, an arylalkyl group having at least about 7 carbon atoms, an arylalkyloxy group having at least about 7 carbon atoms, an alkylaryl group having at least about 7 carbon atoms, or an alkylaryloxy group having at least about 7 carbon atoms.

DETAILED DESCRIPTION OF THE INVENTION

Phase change inks of the present invention contain a phase change carrier system or composition. Any desired or effective carrier composition can be used. Examples of suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S, Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 10 percent by weight of the ink, in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges: and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink of the present invention in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change ink compositions of the present invention also contain a colorant. Any desired or effective colorant can be employed in the inks of the present invention, including dyes, pigments, mixtures thereof, and the like, provided that the colorant can be dissolved or dispersed in the ink vehicle. The phase change carrier compositions of the current invention can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G: Aizen Spilon Yellow C-GNH (Hodogaya Chemical); Sirius Supra Yellow GD 167; Cartasol Brilliant Yellow 4GF (Sandoz): Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks of the present invention. Examples of suitable pigments include Violet Toner VT-8015 (Paul Uhlich): Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lilhol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Also suitable are the colorants disclosed in Copending Application U.S. Ser. No. 10/072,241, filed Feb. 8, 2002, entitled "Phthalocyanine Compositions," Copending Application U.S. Ser. No. 10/072,210, Feb. 8, 2002, entitled "Ink Compositions Containing Phthalocyanines," Copending Application U.S. Ser. No. 10/072,237, filed Feb. 8, 2002, entitled "Methods For Preparing Phthalocyanine Compositions," Copending Application U.S. Ser. No. 10/185,261, filed Jun. 27, 2002, entitled "Processes for Preparing Dianthranilate Compounds and Diazopyridone Colorants," Copending Application U.S. Ser. No. 10/185,994, filed Jun. 27, 2002, entitled "Dimeric Azo Pyridone Colorants," Copending Application U.S. Ser. No. 10/184,269, filed Jun. 27, 2002, entitled "Phase Change Inks Containing Dimeric Azo Pyridone Colorants," Copending Application U.S. Ser. No. 10/185,264, filed Jun. 27, 2002, entitled "Phase Change Inks Containing Azo Pyridone Colorants," Copending Application U.S. Ser. No. 10/186,024, filed Jun. 27, 2002, entitled "Azo Pyridone Colorants," Copending Application U.S. Ser. No. 10/185,597, filed Jun. 27, 2002, entitled "Process for Preparing Subsituted Pyridone Compounds," Copending Application U.S. Ser. No. 10/185,828, filed Jun. 27, 2002, entitled "Method for Making Dimeric Azo Pyridone Colorants," Copending Application U.S. Ser. No. 10/186,023, filed Jun. 27, 2002, entitled "Dimeric Azo Pyridone Colorants," Copending Application U.S. Ser. No. 10/184,266, filed Jun. 27, 2002, entitled "Phase Change Inks Containing Dimeric Azo Pyridone Colorants," Copending Application U.S. Ser. No. 10/260,146, filed Sep. 27, 2002, entitled "Colorant Compounds," with the named inventors Jeffery H. Banning and C. Wayne Jaeger, and Copending Application U.S. Ser. No. 10/260,379, filed Sep. 27, 2002, entitled "Methods for Making Colorant Compounds," with the named inventors C. Wayne Jaeger and Jeffery H. Banning, the disclosures of each of which are totally incorporated herein by reference.

Other ink colors besides the subtractive primary colors can be desirable for applications such as postal marking or industrial marking and labelling using phase change printing, and the present invention is applicable to these needs. Further, infrared (IR) orultraviolet (UV) absorbing dyes can also be incorporated into the inks of the present invention for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat.

No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

In a specific embodiment, the colorant is an isocyanate-derived colored resin as disclosed in, for example, U.S. Pat. No. 5,780,528 and U.S. Pat. No. 5,919,839, the disclosures of each of which are totally incorporated herein by reference. In this embodiment, the colorant is the reaction product of a hydroxyl-substituted or primary or secondary amino-substituted chromophore with an isocyanote. Examples of suitable isocyanates include monoisocyanates, diisocyanates, triisocyonotes, copolymers of a diisocyanate, copolymers of a triisocyonate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used.

The colorant is present in the phase change ink of the present invention in any desired or effective amount to obtain the desired color or hue, typically at least about 0.1 percent by weight of the ink, preferably at least about 0.2 percent by weight of the ink, and more preferably at least about 0.5 percent by weight of the ink, and typically no more than about 50 percent by weight of the ink, preferably no more than about 20 percent by weight of the ink, and more preferably no more than about 10 percent by weight of the ink, although the amount can be outside of these ranges.

The inks of the present invention also contain an antioxidant or UV stabilizer of the formula

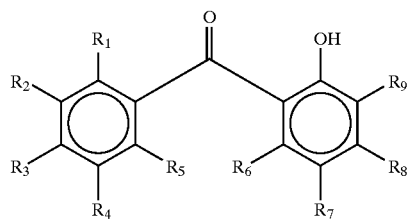

wherein $R_1$, $R_2$, $R_3$, $R_4$, $R_5$, $R_6$, $R_7$, $R_8$, and $R_9$ each, independently of the others, is (i) a hydrogen atom, (ii) a hydroxy group, (iii) an amino group of the formula —$NR_{10}R_{11}$, wherein $R_{10}$ and $R_{11}$ each, independently of the others, is a hydrogen atom, an alkyl group as defined for $R_1$, $R_2$, $R_3$, $R_4$, $R_5$, $R_6$, $R_7$, $R_8$, and $R_9$, an aryl group as defined for $R_1$, $R_2$, $R_3$, $R_4$, $R_5$, $R_6$, $R_7$, $R_8$, and $R_9$, an arylalkyl group as defined for $R_1$, $R_2$, $R_3$, $R_4$, $R_5$, $R_6$, $R_7$, $R_8$, and $R_9$, or an alkylaryl group as defined for $R_1$, $R_2$, $R_3$, $R_4$, $R_5$, $R_6$, $R_7$, $R_8$, and $R_9$, (iv) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, substituted, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least about 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 6 carbon atoms, in another embodiment with at least about 7 carbon atoms, and in yet another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, wherein the alkyl portion of the alkylaryloxy group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 6 carbon atoms, in another embodiment with at least about 7 carbon atoms, and in yet another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a halogen atom, such as fluorine, chlorine, bromine, iodine, or the like, (xiii) a cyano group, (xiv) an aldehyde group, (xv) a ketone group, (xvi) an ester group, (xvii) an amide group, (xviii) a sulfide group, (xix) a sulfoxide group, (xx) a nitrile group, (xxi) a sulfone group, (xxii) an acyl group, or (xxiii) a carboxylic acid group, provided that at least one of $R_1$, $R_2$, $R_3$, $R_4$, $R_5$, $R_6$, $R_7$, $R_8$, and $R_9$ is (a) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group) having in one embodiment at least about 8 carbon atoms, in another embodiment at least about 10 carbon atoms, in yet another embodiment at least about 12 carbon atoms, in still another embodiment at least about 14 carbon atoms, in another embodiment at least about 16 carbon atoms, and in yet another embodiment at least about 18 carbon atoms, and in one embodiment with no more than about 48 carbon atoms, in another embodiment no more than about 30 carbon atoms, and in yet another embodiment no more than about 20 carbon atoms, although the number of carbon atoms con be outside of these ranges, (b) an alkoxy group (including linear, branched, saturated, unsaturated, cyclic, substituted, and unsubstituted alkoxy groups, and wherein hetero atoms, such as oxygen, nitrogen, sulfur, silicon, phosphorus, and the like either may or may not be present in the alkyl portion of the alkoxy group) having in one embodiment at least about 8 carbon atoms, in another embodiment at least about 10 carbon atoms, in yet another embodiment at least about 12 carbon atoms, in still another embodiment at least about 14 carbon atoms, in another embodiment at least about 16 carbon atoms, arid in yet another embodiment at least about 18 carbon atoms, and in one embodiment with no more than about 48 carbon atoms, in another embodiment no more than about 30 carbon atoms, and in yet another embodiment no more than about 20 carbon atoms, although the number of carbon atoms can be outside of these ranges, (c) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in another embodiment with at least about 10 carbon atoms, and in one embodiment with no more than about 14 carbon atoms, although the number of carbon atoms can be outside of these ranges, (d) an aryloxy group (including unsubstituted and substituted aryloxy groups, and wherein hetero atoms, such as oxygen, nitrogen, sulfur, silicon, phosphorus, and the like either may or may not be present in the aryl portion of the aryloxy group), in one embodiment with at least about 6 carbon atoms, and in another embodiment with at least about 10 carbon atoms, and in one embodiment with no more than about 14 carbon atoms, although the number of carbon atoms can be outside of these ranges, (e) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (f) an arylalkyloxy group (including unsubstituted and substituted arylalkyloxy groups, wherein the alkyl portion of the arylalkyloxy group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (g) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, or (h) an alkylaryloxy group (including unsubstituted and substituted alkylaryloxy groups, wherein the alkyl portion of the alkylaryloxy group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, wherein the substituents on the substituted alkyl, aryl; arylalkyl, alkylaryll alkoxy, aryloxy, arylalkyloxy, and alkylaryloxy groups can be (but are not limited to) hydroxy groups, halogen atoms, amine groups, imine groups, cyano groups, pyridine groups, ether groups, aldehyde groups, ketone groups, ester groups, amide groups, carbonyl groups, sulfonate groups, sulfide groups, sulfoxide groups, phosphine groups, nitrile groups, nitroso groups, sulfone groups, acyl groups, acid anhydride groups, cyanato groups, thiocyanato groups, carboxylic acid groups, mixtures thereof, and the like, wherein two or more substituents can be joined together to form a ring.

Specific examples of suitable substituted hydroxybenzophenones include 2-hydroxy-4-n-octoxybenzophenone ("HOOB", available as MARK 1413 from the Argus Division of Witco Corp.) and from Aldrich Chemical Co., Milwaukee, Wis. (41,315-1), of the formula

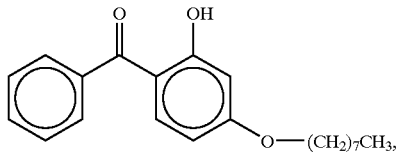

2-hydroxy-4-methylbenzophenone, commercially available from Interchim Intermediates, 2-hydroxy-4-methylbenzophenone, commercially available from Aldrich Chemical Co., Milwaukee, Wis. (H3,860-8), and the like.

In addition, suitable materials having alkoxy, aryloxy, arylalkyloxy, or alkylaryloxy groups thereon can be prepared by reaction of the corresponding phenol with an alkylating material, such as the p-toluenesulfonate ester of the corresponding alcohol, halogen derivatives of the corresponding alcohol, or the like. Approximately equimolar amounts of the two reactants can be admixed with at least about 1 equivalent of a suitable base, such as $K_2CO_3$, KOH, NaOH, $NaOC_2H_4$, $NaNH_2$, or the like, in a dipolar aprotic solvent, such as dimethyl formamide, N-methyl pyrrolidinone, acetonitrile, or the like, and heated to reflux temperatures, typically (although not necessarily) from about 100 to about 150° C., until the reaction is complete. These reactions are also suitable for phase transfer catalyzed reaction conditions. For example, 2-hydroxy-4-n-stearyloxybenzophenone can be prepared by the reaction of 2,4-dihydroxybenzophenone with the p-toluenesulfonate ester of stearyl alcohol and 2 equivalents of potassium carbonate in dimethyl formamide at 125° C. for about 5 hours as follows:

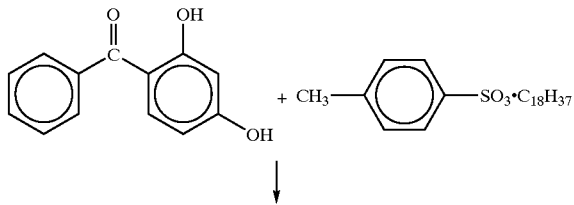

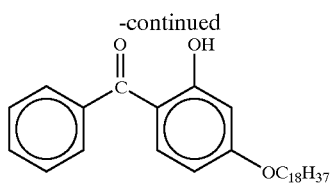

Further, suitable materials having alkyl, aryl, arylalkyl, or alkylaryl groups thereon can be prepared by methods such as those disclosed in, for example, H. Shargi and B. Kaboudin, Journal of Chemical Research, Synopsis, (1998) (10) 628–629 2678–2695; and Jpn Kokai Tokkyo Koho (1983) JP 81-138045 Chem Abstracts 99:38201; the disclosures of each of which are totally incorporated herein by reference.

The antioxidant or UV stabilizer is present in the phase change inks of the present invention in any desired or effective amount, in one embodiment at least about 0.1 percent by weight, in another embodiment at least about 1 percent by weight, and in yet another embodiment at least about 2 percent by weight, and in one embodiment no more than about 15 percent by weight, in another embodiment no more than about 10 percent by weight, and in yet another embodiment no more than about 5 percent by weight, although the amount can be outside of these ranges.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in. one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydrodbietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can. be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phtholate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

In the direct printing mode, the phase change carrier composition in specific embodiments contains one or more materials that enable the phase change ink (1) to be applied in a thin film of uniform thickness on the final recording substrate (such as paper, transparency material, or the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in specific embodiments exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

The ink compositions of the present invention typically have melting points no lower than about 50° C., preferably no lower than about 700C, and more preferably no lower than about 80° C., and typically have melting points no higher than about 160° C., preferably no higher than about 140° C., and more preferably no higher than about 100° C., although the melting point can be outside of these ranges.

The ink compositions of the present invention generally have melt viscosities at the jetting temperature (typically no lower than about 75° C. preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 30 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

The ink compositions of the present invention can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks of the present invention are solid at ambient temperature.

The inks of the present invention can be employed in apparatus for direct printing ink jet processes and in indirect (offset) printing ink jet applications. Another embodiment of the present invention is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, or the like. Phase change inks of the present invention can also be used in printing processes other than hot melt ink jet printing processes, such as hot melt gravure printing, hot melt medical imaging printing, or the like.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

Specific embodiments at the invention will now be described in detail. These examples are intended to be illustrative, and the invention is not limited to the materials, conditions, or process parameters set forth in these embodiments. All parts and percentages are by weight unless otherwise indicated.

EXAMPLE I

In a 500 milliliter round bottom flask equipped with mechanical stirrer, reflux condenser, and nitrogen purge is added 225 milliliters of dimethyl formamide, 21.4 grams (0.1 mole) of 2,4-dihydroxybenzophenone, 42.4 grams (0.1 mole) of stearyl p-toluenesulfonate, and 13.8 grams (0.1 mole) of potassium carbonate. The mixture is heated rapidly to reflux and held there for two hours. After cooling to room temperature, 500 milliliters of toluene is added and the mixture is filtered to remove solids, extracted two times with deionized water, and washed with brine. After further drying with sodium sulfate, the mixture is filtered and the solvent is removed on a rotary evaporator to afford an off-white solid whose NMR spectra confirm the anticipated structure:

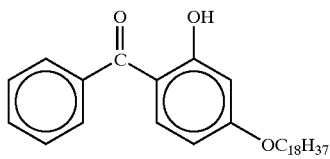

EXAMPLE II

Ink compositions were prepared containing stearyl stearamide wax (KEMAMIDE® S-180, obtained from Crompton Corporation, Greenwich, Conn.), polyethylene wax (POLYWAX® 850, obtained from Baker Petrolite, Tulsa, Okla.), a first resin ("Resin 1", prepared as described in Example 2 of U.S. Pat. No. 5,783,658, the disclosure of which is totally incorporated herein by reference), a second resin ("Resin 2", prepared as described in Example 5 of U.S. Pat. No. 5,783,658), Solvent Red 127 dye (INTERPLAST PINK 5GLB, obtained from Crompton and Knowles Co., Reading, Pa.), Solvent Red 49 dye (NEPTUNE RED BASE NB 543 LD, obtained from BASF Co., Rensselaer, N.Y.), dodecyl benzene sulfonic acid ("DDBSA", BioSoft S-101, obtained from Stepan Company, Northfield, Ill.), and NAU-GUARD® 445 antioxidant (obtained from Uniroyal Chemical Co., Middlebury, Conn.). Ink 1 was a control (comparative) ink containing no antioxidant, and Ink 2 was an ink containing an antioxidant according to the present invention ("HOOB", 2-hydroxy-4-n-octoxybenzophenone, obtained as MARK 1413 from the Argus Division of Witco Corp.). The inks contained the ingredients in the following relative amounts (expressed in parts by weight);

| Ingredient | Ink 1 | Ink 2 |
|---|---|---|
| S-180 | 45.30 | 43.94 |
| POLYWAX 850 | 5.00 | 4.85 |
| Resin 1 | 23.35 | 22.65 |
| Resin 2 | 23.35 | 22.65 |
| SR 127 | 0.30 | 0.29 |
| SR 49 | 2.00 | 1.94 |
| DDBSA | 0.50 | 0.49 |
| NAUGUARD 445 | 0.20 | 0.19 |
| HOOB | — | 3.0 |
| Example II resin | — | — |

These ingredients were combined in the proportions listed to make three inks in amounts of about 500 grams each. The inks were prepared as follows: The uncolored ingredients were weighed out and combined in 1 liter stainless steel beakers. The beakers were then placed in an oven at about 130° C. for several hours until the materials were fully melted. Thereafter, the beakers were placed in heating mantles at 130° C. and mechanically stirred for about 0.5 hour to mix thoroughly the ink base. The dyes and UV stabilizing materials were then added and the ink was stirred for an additional 1 hour. At that point, the finished formulations were filtered through a Mott apparatus using #3 Whatmon filter paper. The finished inks were then poured into sticks and placed in a TEKTRONIX® PHASER® 340 printer. Solid fill magenta prints were made of each ink and the prints were evaluated for color loss after exposure to a 2500-W xenon arc lamp in an Atlas Fade-Ometer (Atlas Electric Devices Co., Chicago, Ill.) per ASTM G-26. The AE values were measured on an ACS® calorimeter (from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. Color differences were determined following ASTM D2244-89 (Standard Test Method for Calculation of Color Differences From instrumentally Measured Color Coordinates) $\Delta E=[(L^*_1-L^*_2)^2+(a^*_1-a^*_2)^2+(b^*_1-b^*_2)^2]^{1/2}$. The table below shows the values of AE indicating the change in color values:

|  | Ink 1 | Ink 2 |
|---|---|---|
| ΔE | 38 | 22 |

As the data indicate, the ink containing the antioxidant according to the present invention exhibited substantially improved lightfastness compared to the ink containing no UV absorber.

EXAMPLE III

The process of Example II is repeated except that 2-hydroxy-4-n-stearyloxybenzophenone prepared as described in Example I is substituted for the 2-hydroxy-4-n-octoxybenzophenone. It is believed that similar results will be observed.

EXAMPLE IV

A phase change ink according to the present invention is prepared as follows. A solid ink carrier composition is prepared as described in Example 13 of U.S. Pat. No. 5,780,528, the disclosure of which is totally incorporated herein by reference. To this composition is added about 3.5 weight percent of Solvent Red 49 dye (a rhodamine dye obtained from BASF, Germany) along with about 3 weight percent of 2-hydroxy-4-n-octoxybenzophenone ("HOOB", available as MARK 1413 from the Argus Division of Witco Corp.) and 0.75 weight percent of dodecyl benzene sulfonic acid (BioSoft S-101, obtained from Stepan Company, Northfield, Ill.). After stirring for about 3 additional hours, the magenta ink thus formed is filtered through a heated MOTTOR apparatus (obtained from Mott Metallurgical) using #3 Whatman filter paper and a pressure of about 15 pounds per square inch. The filtered phase change ink is poured into molds and is allowed to solidify to form ink sticks.

EXAMPLE V

The process of Example IV is repeated except that 2-hydroxy-4-n-stearyloxybenzophenone prepared as described in Example I is substituted for the 2-hydroxy-4-n-octoxybenzophenone. It is believed that similar results will be observed.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising (a) a colorant, (b) a phase change ink carrier, and (c) an antioxidant or UV stabilizer molecule of the formula

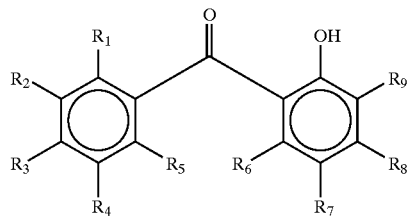

wherein $R_1$, $R_2$, $R_3$ $R_4$, $R_5$, $R_6$, $R_7$, $R_8$, and $R_9$ each, independently of the others, is (i) a hydrogen atom, (ii) a hydroxy group, (iii) an amino group, (iv) an alkyl group, (v) an aryl group, (vi) an arylalkyl group, (vii) an alkylavyl group, (viii) an alkoxy group, (ix) an aryloxy group, (x) an arylalkyloxy group, (xi) an alkylaryloxy group, (xii) a halogen atom, (xiii) a cyono group, (xiv) an aldehyde group, (xv) a ketone group, (xvi) an ester group, (xvii) an amide group, (xviii) a sulfide group, (xix) a sultoxide group, (xx) a nitrile group, (xxi) a sulfone group, (xxii) an acyl group, or (xxiii) a ccrboxylic acid group, provided that at least one of $R_1$, $R_2$, $R_3$, $R_4$, $R_5$, $R_6$, $R_7$, $R_8$, and $R_9$ is an alkyl group having at least about 8 carbon atoms, an aryl group having at least about 6 carbon atoms, an aryloxy group having at least about 6 carbon atoms, an arylalkyl group having at least about 7 carbon atoms, an arylalkyloxy group having at least about 7 carbon atoms, an alkylaryl group having at least about 7 carbon atoms, or an alkylaryloxy group having at least about 7 carbon atoms.

2. A phase change ink composition according to claim 1 wherein the phase change ink carrier cornprses a monoamide, a tetra-amide, or a mixture thereof.

3. An ink composition according to claim 1 wherein the phase change ink carrier comprises (a) steoryl stearamide, (b) a dimer acid based tetra-amide that is the reaction product of dimer acid, ethylene diamine, and stearic acid, or (c) mixtures thereof.

4. An ink composition according to claim 1 wherein the phase change ink carrier comprises (a) stearyl stearamide, (b) a dimer acid based tetra-amide that is the reaction product of dimer acid, ethylene calamine, and a corboxylic acid having at least about 36 carbon atoms, or (c) mixtures thereof.

5. An ink composition according to claim 4 wherein the carboxylic acid has at least about 40 carbon atoms, and wherein the carboxylic acid has no more than about 200 carbon atoms.

6. An ink composition according to claim 1 wherein the phase change ink carrier comprises an isocyanate-derived material.

7. An ink composition according to claim 1 wherein the phase change ink carrier comprises a urethane isocyanate-derived material, a urea isocyanate-derived material, a urethane/urea isocyonate-derived material, or mixtures thereof.

8. An ink composition according to claim 1 wherein the phase change ink carrier comprises a mixture of one or more amides and one or more isocyanate-derived materials.

9. An ink composition according to claim 1 wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylenelvinyl acetate copolymers, ethylene/acrylic acid copolymers, ethylene/vinyl acetate/acrylic acid copolymers, copolymers of acrylic acid with polyamides, ionomers, and mixtures thereof.

10. An ink composition according to claim 1 wherein the ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (a) a urethane resin derived from the reaction of two equivalents of hydroabietyl alcohol and one equivalent of isophorone discyanote, (e) a urethane resin that is the adduct of three equivalents of stearyl isocyanote and a glycerol-based alcohol, and (f) an antioxidant.

11. An ink composition according to claim 1 wherein the ink carrier comprises (a) a polyethylene wax in an amount of at least about 25 percent by weight of the ink and in an amount of no more than about 60 percent by weight of the ink, (b) a steoryl stearomide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabietyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

12. An ink composition according to claim 1 wherein at least one of $R_1$, $R_2$, $R_3$, $R_4$, $R_5$, $R_6$, $R_7$, $R_8$, and $R_9$ is an alkyl group having at least about 8 carbon atoms.

13. An ink composition according to claim 1 wherein at least one of $R_1$, $R_2$, $R_3$, $R_4$, $R_5$, $R_6$, $R_7$, $R_8$ and $R_9$ is an aryl group having at least about 6 carbon atoms or an aryloxy group having at least about 6 carbon atoms.

14. An ink composition according to claim 1 wherein at least one of $R_1$, $R_2$, $R_3$, $R_4$, $R_5$, $R_6$, $R_7$, $R_8$, and $R_9$ is an arylalkyl group having at least about 7 carbon atoms, an arylalkyloxy group having at least about 7 carbon atoms, an alkylaryl group having at least about 7 carbon atoms, or an alkylaryloxy group having at least about 7 carbon atoms.

15. A phase change ink composition comprising (a) a colorant, (b) a phase change ink carrier, and (c) an antioxidant or UV stabilizer molecule, wherein the antioxidant or UV stabilizer molecule is 2-hydroxy-4-n-stearyloxybenzophenone.

16. An ink composition according to claim 1 wherein the antioxidant or UV stabilizer molecule is present in the ink in an amount of at least about 0.1 percent by weight of the ink.

17. An ink composition according to claim 1 wherein the antitoxidant or UV stabilizer molecule is present in the ink in an amount of no more than about 15 percent by weight of the ink.

18. A process which comprises (1) incorporating into an ink jet printing apparatus a phase change ink composition comprising (a) a colorant, (b) a phase change ink carrier, and (c) an antioxidant or UV stabilizer molecule of the formula

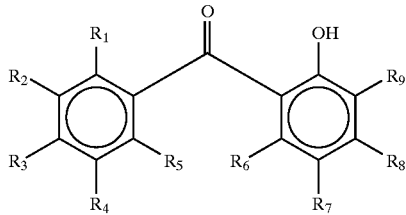

wherein $R_1$, $R_2$, $R_3$, $R_4$, $R_5$, $R_6$, $R_7$, $R_8$, and $R_9$ each, independently of the others, is (i) a hydrogen atom, (ii) a hydroxy group, (iii) an amino group, (iv) an alkyl group, (v) an aryl group, (vi) an arylailkyl group, (vii) an alkylaryl group, (viii) an alkoxy group, (ix) an oryloxy group, (x) an arylalkyloxy group, (xi) an alkylaryloxy group, (xii) a halogen atom, (xiii) a cyono group, (xiv) an aldehyde group, (xv) a ketone group, (xvi) an ester group, (xvii) an amide group, (xviii) a sulfide group, (xix) a sulfoxide group, (xx) a nitrile group, (xxi) a sulfone group, (xxii) an acyl group, or (xxiii) a carboxyllc acid-group, provided that at least one of $R_1$, $R_2$, $R_3$, $R_4$, $R_5$, $R_6$, $R_7$, $R_8$, and $R_9$ is an alkyl group having at least about 8 carbon atoms, an aryl group having at least about 6 carbon atoms, an aryloxy group having at least about 6 carbon atoms, an arylalkyl group having at least about 7 carbon atoms, an arylalkyloxy group having at least about 7 carbon atoms, an alkylaryl group having at least about 7 carbon atoms, or an alkylaryloxy group having at least about 7 carbon atoms; (2) melting the ink; and (3) causing droplets of the melted ink to be ejected in an imagewise pattern onto a substrate.

19. A process according to claim 18 wherein the substrate is a final recording sheet and droplets of the melted ink are ejected in an imagewise pattern directly onto the final recording sheet.

20. A process according to claim 18 wherein the substrate is an intermediate transfer member and droplets of the melted ink are ejected in an imagewise pattern onto the intermediate transfer member followed by transfer of the imagewise pattern from the intermediate transfer member to a final recording sheet.

21. A process according to claim 20 wherein the intermediate transfer member is heated to a temperature above that of the final recording sheet and below that of the melted ink in the printing apparatus.

22. A process according to claim 18 wherein the printing apparatus employs a piezoelectric ink jet process, wherein droplets of the ink are caused to be ejected in imagewise pattern by oscillations of piezoelectric vibrating elements.

* * * * *